US012810030B1

(12) United States Patent
Arbuckle et al.

(10) Patent No.: US 12,810,030 B1
(45) **Date of Patent: *Nov. 24, 2026**

(54) DATA ANONYMIZATION USING SELECTIVE NOISE FUNCTIONS

(71) Applicant: Privacy Analytics Inc., Ottawa (CA)

(72) Inventors: Lon Michel Luk Arbuckle, Ottawa (CA); Devyani Biswal, Toronto (CA)

(73) Assignee: PRIVACY ANALYTICS INC., Ottawa (CA)

( * ) Notice: Subject to any disclaimer, the term of this patent is extended or adjusted under 35 U.S.C. 154(b) by 17 days.

This patent is subject to a terminal disclaimer.

(21) Appl. No.: 19/179,925

(22) Filed: Apr. 15, 2025

Related U.S. Application Data

(63) Continuation of application No. 17/956,928, filed on Sep. 30, 2022, now Pat. No. 12,321,494.

(60) Provisional application No. 63/344,593, filed on May 22, 2022, provisional application No. 63/261,945, filed on Sep. 30, 2021.

(51) Int. Cl.
*G06F 21/62* (2013.01)
*G06F 21/64* (2013.01)

(52) U.S. Cl.
CPC .......... *G06F 21/6254* (2013.01); *G06F 21/64* (2013.01)

(58) Field of Classification Search
CPC .............................. G06F 21/6254; G06F 21/64
USPC ........................................................ 726/30
See application file for complete search history.

(56) References Cited

U.S. PATENT DOCUMENTS

| | | | | |
|---|---|---|---|---|
| 12,321,494 | B2 | 6/2025 | Arbuckle et al. | |
| 2017/0101954 | A1 | 4/2017 | Krüger et al. | |
| 2017/0109544 | A1* | 4/2017 | Chen | G06F 21/6254 |
| 2017/0177907 | A1 | 6/2017 | Scaiano et al. | |
| 2019/0050599 | A1 | 2/2019 | Canard et al. | |
| 2020/0159961 | A1* | 5/2020 | Smith | G06F 21/44 |
| 2021/0224406 | A1* | 7/2021 | Shrinivasan | G06F 21/64 |
| 2021/0256151 | A1 | 8/2021 | Damewood et al. | |

(Continued)

FOREIGN PATENT DOCUMENTS

| | | | |
|---|---|---|---|
| CN | 105512566 | A | 4/2016 |
| WO | 2014088903 | A1 | 6/2014 |

OTHER PUBLICATIONS

European Search Report received in EP Application No. 22874032.0 on Apr. 14, 2025.

(Continued)

*Primary Examiner* — Teshome Hailu
(74) *Attorney, Agent, or Firm* — Troutman Pepper Locke LLP

(57) ABSTRACT

A method includes collecting one or more datasets of information; first determining whether information within blocks of data are consistent or if one or more violations occur within the blocks of data; applying a first noise function to the blocks of data when the first determining comprises determining that the information within the blocks of data are consistent, the first noise function comprising a first type of noise distribution function; applying a second noise function to the blocks of data when the first determining comprises determining that the one or more violations occur within the blocks of data, the second noise function comprising a second type of noise distribution function in combination with the first type of noise distribution function; and displaying the blocks of data with at (Continued)

least one of the first noise function or the second noise function.

20 Claims, 8 Drawing Sheets

(56) References Cited

U.S. PATENT DOCUMENTS

2021/0374279 A1* 12/2021 Zheng .................... G06N 3/045
2023/0100347 A1 3/2023 Arbuckle et al.

OTHER PUBLICATIONS

International Preliminary Report on Patentability issued Apr. 2, 2024 in connection with corresponding International Application No. PCT/CA2022/051459 (5 pages total).
International Search Report and Written Opinion mailed Jan. 5, 2023; issued in connection with corresponding International Application No. PCT/CA2022/051459 (3 pages total).
International Search Report and Written Opinion in International Appln. No. PCT/CA2022/051459, mailed on Jan. 5, 2023, 7 pages.

* cited by examiner

200

500

500

700

DATA ANONYMIZATION USING SELECTIVE NOISE FUNCTIONS

RELATED APPLICATIONS

This application is a continuation of U.S. patent application Ser. No. 17/956,928, filed Sep. 30, 2022, which claims priority to and the benefit of U.S. Provisional Patent Application No. 63/344,593, filed May 22, 2022, and of U.S. Provisional Patent Application No. 63/261,945, filed Sep. 30, 2021, each of which is hereby incorporated by reference in its entirety.

TECHNICAL FIELD

The present disclosure generally relates to ensuring consistent data within blocks of data in a computing system by applying a mixed noise mechanism.

BACKGROUND

A bridge can be created between data and artificial intelligence (AI) methods. The safe AI bridge calls the data, but it injects a suitable degree of noise to the data before passing on to the AI method, including federated models. The noise can be continuous or categorical and based on a threshold to ensure disclosure risks are minimized.

Perturbation can occur to the data itself before any analytical or AI method is applied. Other disclosure control approaches require analytical methods to be completely rewritten to support the technology. These other approaches add extra overhead that require additional training of experts unfamiliar with the implemented software, constrain implementation to well established AI algorithms and methods, increase diskspace from rewriting and reimplementing AI methods with the integrated data protection, and reduced processing speeds can occur from the integrated data protection.

Differential privacy is a widely accepted method to protect data. Differentially private noise can be applied to one or more datasets. The Laplace distribution has become synonymous with a mechanism being differentially private.

The Laplace distribution may not be optimal when it relates to fixing privacy and data utility with respect to the datasets. The Laplace noise can yield more variability than normal noise. The Laplace distribution has a higher kurtosis than a normal distribution due to the greater variability.

From a data utility perspective, it is preferable to add a normal noise function instead of a Laplace noise function, or even other noise functions depending on the application and needs. A different noise function could satisfy the differential privacy requirements. The loss of information can be reduced as a result.

However, the different noise function will not be sufficient when there are violations or greater loss of information. In addition, the different noise function may also not suffice when there is distortion or variance in the data.

Accordingly, a need exists to provide a noise function that will satisfy differential privacy, and not let one or more violations to occur within blocks of information. Further, the need exists for the data utility of the information to be optimized as well.

A challenge with differential privacy is also that the amount of Laplace noise to include is unknown and variable. Estimating the number of similarly looking subjects in a group is a common benchmark to set a threshold. A need therefore exists for creating a threshold on violations within blocks of information, thereby reducing the training needed due to the conceptually simpler framing.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

The aforementioned aspects and other objectives can now be achieved as described herein.

In an embodiment, a method includes collecting one or more datasets of information. The method also includes separating the one or more datasets into respective blocks of data. The method also includes determining whether the information within the blocks of data are consistent, or if one or more violations occur within the blocks of data. The method further includes applying a first noise function based on the determination that the information within the blocks of data are consistent. The first noise function is applied when a loss of privacy and/or confidentiality exceeds a threshold. The method also includes displaying the blocks of data with the first noise function.

The method also includes applying a second noise function based on the determination that the one or more violations have occurred within the blocks of data.

The information includes educational information on one or more users.

In an embodiment, a computer program product is configured to collect one or more datasets of information. The computer program product also separates the one or more datasets into respective blocks of data. Further, the computer program product determines whether the information within the blocks of data are consistent or if one or more violations appear within the blocks of data. The computer program product applies a first noise function based on the determination that the information within the blocks of data are consistent. The first noise function is applied when a loss of privacy and/or confidentiality exceeds a threshold. The computer program product displays the blocks of data with the first noise function.

The computer program product determines a threshold on personal and/or confidential information based on the number of expected subjects in a block of data, and/or on the consistency of the block of data.

A second noise function is applied to correct the one or more violations within the blocks of data.

A second noise function is applied when patient and personal and/or confidential information within the blocks of data contain the one or more violations.

In an embodiment, a system includes one or more processors. The one or more processors collect one or more datasets of information. The one or more processors also separate the one or more datasets into respective blocks of data. Further, the one or more processors determine whether the information within the blocks of data are consistent or if one or more violations appear within the blocks of data. The one or more processors also apply a first noise function based on the determination that the information within the blocks of data are consistent. The first noise function is applied when a loss off privacy and/or confidentiality exceeds a threshold. The one or more processors also display the blocks of data with the first noise function.

The blocks of data are displayed with the first noise function combined with a second noise function when the one or more violations occur.

The first noise function is combined with a second noise function to remove or correct the one or more violations within the blocks of data.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION OF SOME EMBODIMENTS

Background and Context

Figure 1:
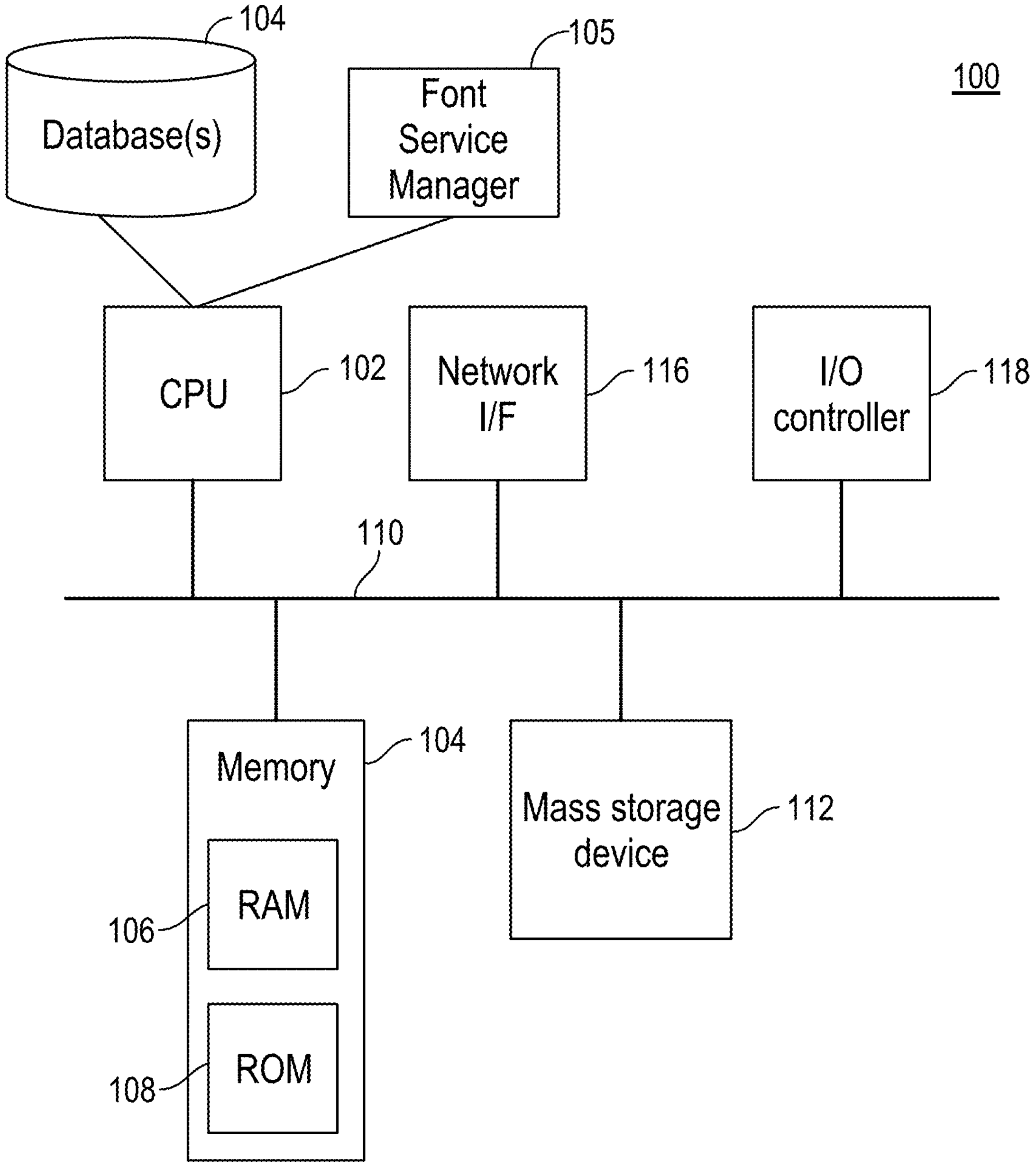
FIG. 1 illustrates a computing system in accordance with an embodiment of the invention.

Subject matter will now be described more fully herein with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc. v. H. J. Heinz Co.,* 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems to enable gas meter to perform self-checking to determine its overall functioning without requiring a meter operator.

Introduction

Embodiments of the present invention include a mixed-noise mechanism that improves data utility for information received within a computational system. The mixed-noise mechanism will provide greater improvement to data utility as opposed to a Laplace noise function.

Embodiments of the present invention include a system for pulling large datasets of data from one or more databases. The information can include information on patients, such as health information. The information can also include financial information, education information, and other confidential or private information. Moreover, any type of information can be included in the received datasets of information. The central processing unit (CPU) within the computing system can then separate the received datasets into blocks of data.

The CPU can determine if the sensitivity of the data appears large or small, and if one or more violations appear within the blocks of data. The CPU will determine if the violations appear and if the sensitivity of the data is small or large to identify whether to apply a noise function (e.g., k-noise function or a noise distribution function). The use of the Gaussian noise is used as an example for the place of noise distribution function. Any noise function that meets the criteria of the threshold can be used. The k-noise function involves a similarity threshold noise level that that user decides. Moreover, there are established benchmarks for similarity levels using k. K is typically an integer of 1 or more, representing the number of subjects expected in a block of data, and/or fractional when used as a risk function with 1/k. With the k-noise function, there is no need to adjust any functions, besides the desired noise function and variance which can be adjusted globally, by individual blocks, or by individual subjects in order to achieve the desired similarity threshold of k and/or utility requirements. In contrast, only the output needs to be varied or changed. As such, the CPU also determines whether to add the Laplace noise function onto the Gaussian noise function or k-noise function.

The CPU will identify if the blocks of data appear normal and consistent, or if violations appear that distort the data. Further, the CPU will also identify if the sensitivity of the data is large. As such, when the CPU has identified that the blocks of data appear consistent, and that the sensitivity of data is small, the CPU will apply the Gaussian noise function and/or the k-noise function. Accordingly, either the Gaussian noise function and/or k-noise function will be applied to the blocks of data that appear normal/consistent and have a small sensitivity level.

When the CPU determines that the sensitivity of the data is large and/or that one or more violations have occurred within the blocks of data relative to similarity and indistinguishability in relation to differential privacy, the CPU will apply the Laplace noise function. The Laplace noise function combined with the Gaussian noise function and/or k-noise function will thereby function as a mixed-noise mechanism.

The mixed-noise mechanism will reduce or eliminate the one or more violation within the blocks of data. The variance and sensitivity of data will not be at high levels as a result. The distortion within the blocks of data will be reduced as well.

Accordingly, the mixed-noise mechanism will be utilized when the variance, distortion, and sensitivity of the data are at high levels. Further, the mixed-noise mechanism will also be used when one or more violations occur within the blocks of data relative to differential privacy.

The mixed-noise mechanism can enable the information such as financial information, educational information, health information, and other confidential and private information to not be compromised. The information within the blocks of data will not be distorted, or be significantly altered from their underlying attributes. The data utility of the information within the blocks of data will also be improved and optimized as a result. Further, for fixing privacy issues and focusing on the data utility perspective, the mixed-noise mechanism can be the optimal approach.

System Structure

FIG. 1 illustrates a computing system 100. The computing system 100 includes a computer-processing unit (CPU) 102. The CPU 102 is connected to memory 104 with a random access memory (RAM) 106 and read only memory (ROM) 108. The CPU 102 is also connected to one or more databases 104 and a fond service manager 105. A communication interface 110 can enable the CPU 102 to be connected to a network 116 and a controller 118.

In FIG. 1, in an embodiment, the CPU 102 can collect one or more datasets of information from the one or more databases 104. The CPU 102 can separate or cluster the one or more datasets into respective blocks of data. Further, the CPU 102 will determine whether the information within the blocks of data is consistent and/or normal. The information can include health information on patients, financial information, educational information, and other parts of confidential or private information. The information can be for a multitude of users. As such, the CPU 102 will determine if the information within the blocks of data are normal, or where or one or more violations occur within the blocks of data relative to differential privacy.

In FIG. 1, the CPU 102 will also average the loss of privacy or confidentiality for each of the blocks of data to determine if the blocks of data are normal and consistent. Further, when the information within the blocks of data includes patient information, financial information, or other confidential or private information, the CPU 102 will combine the patient information, financial information, and other information with analytical results that are relative to any protocol deviations to determine if the blocks of data are consistent and normal. The CPU 102 will also apply any confidential information within the blocks of data to identify a necessary threshold to determine whether the blocks of data are normal and consistent.

In FIG. 1, when the sensitivity of the information is small, the CPU 102 will determine that the blocks of data are normal and consistent. When the CPU 102 determines that the blocks of data are normal, the CPU 102 will apply a noise function (k-noise or any noise distribution function such as the Gaussian noise). Moreover, the k-noise function is a noise function in which the user determines the threshold level where k is an integer or fractional value of 1 or more. The k-noise function also includes established benchmarks for the similarity threshold levels. No functions need to be adjusted, besides the selection of a noise function and variance. Instead, only the output would need to be changed or varied. Accordingly, the CPU 102 will also apply the noise function when a loss of privacy and/or confidentiality within the blocks of data exceeds a threshold. Further, the CPU 102 will also determine when one or more deviations in the blocks of data are identified when the Gaussian or k-noise function is applied. The CPU 102 will also improve the data utility of the blocks of data. As mentioned above, the blocks of data can include patient information, education information, financial information, and other pieces of confidential and private information.

Referring to FIG. 1, the CPU 102 can also determine that one or violations have occurred within the blocks of data. The one or more violations will relate to similarity of subjects and/or indistinguishability relative to differential privacy. When one or more violations have occurred, the CPU 102 can determine that the sensitivity of the data is large. When patient information, financial information, educational information or any information within the blocks of data contain the one or more violations, the CPU 102 will apply the Laplace noise function to correct or reduce the violations. When the CPU 102 determines that the sensitivity of the data is very large, the CPU 102 will apply a Laplace noise function to the blocks of data. In some embodiments, the Laplace noise function can also be applied when the loss of privacy or confidentiality of the blocks of data do not exceed a threshold.

In FIG. 1, the Laplace noise function will be applied in combination with the Gaussian or k-noise function. Moreover, when the Laplace noise function is applied with the Gaussian or k-noise function, a mixed-noise mechanism is thereby applied to the blocks of data. When the mixed-noise mechanism is applied, the violations within the blocks of data can be reduced and/or removed, wherein the sensitivity of the data will be reduced as a result. The distortion and variance within the blocks of data will also be reduced as well. The CPU 102 can also apply the Laplace noise function if the Gaussian noise function has caused any distortion within the blocks of data after the Gaussian noise function has been applied. When the blocks of data do not appear to be normal, and the variance or sensitivity level is high, the mixed-noise mechanism is applied. By applying the mixed-noise mechanism to the anonymized datasets, the required noise can be reduced as a result. In addition, the mixed-noise mechanism thereby also improves the utility of the blocks of data.

Figure 2:
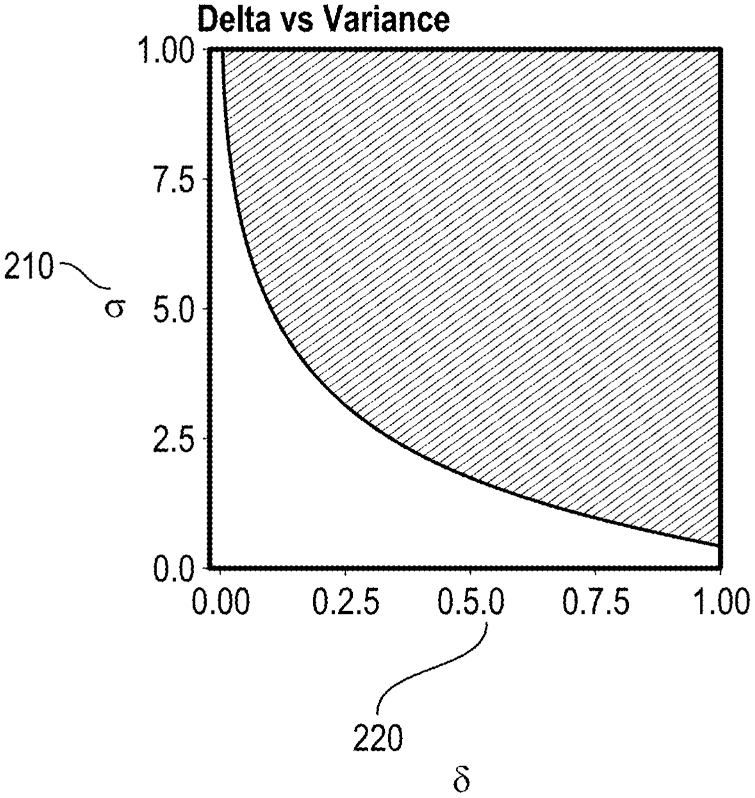
FIG. 2 illustrates a graph showing the representation/justification for how much approximate differential privacy constrains noise, wherein a solution to this is the mixed-noise mechanism in accordance with an embodiment of the invention.

In FIG. 2, a graphical system 200 is illustrated showing the relationship between the Gaussian and Laplace noise functions. A variance σ 210 and probability of information leakage δ 220 are illustrated. A normal noise function or Gaussian noise function is advantageous with respect to data utility. In embodiments, the k-noise function can also be used as the normal noise function. If the Gaussian or k-noise function is used, differential privacy DP could exceed a threshold and be violated. As such, the probability of information leakage δ 220 should be as small as possible. Moreover, the probability of information leakage δ 220 should be between zero and one. To compensate for the value of the probability of information leakage δ 220 being small, the variance σ 210 has to be very large, as illustrated in FIG. 2.

Referring to FIG. 2, the large variance σ 210 negatively affects the data utility due to the increase in variability to ensure differential privacy DP. When the sensitivity in FIG. 2 is large, a Laplace noise function is applied to reduce the sensitivity and increase the data utility. In contrast, when the sensitivity is small, a Gaussian or k-noise function with the same variance σ 210 as the Laplace noise function is added. A same variance σ 210 can be obtained if a Gaussian noise function, k-noise function or Laplace noise function is applied. By fixing the variance σ 210 to be equivalent with either the Gaussian, k-noise, or Laplace noise function, a mixed noise mechanism with the combined Gaussian/k-noise function, and Laplace noise function can be applied. Moreover, by fixing the variance to be equivalent in either method, a more accurate sense of the improvement can be obtained when implemented the mixed-noise mechanism. The data utility is also improved as a result of the mixed-noise mechanism.

Figure 3:
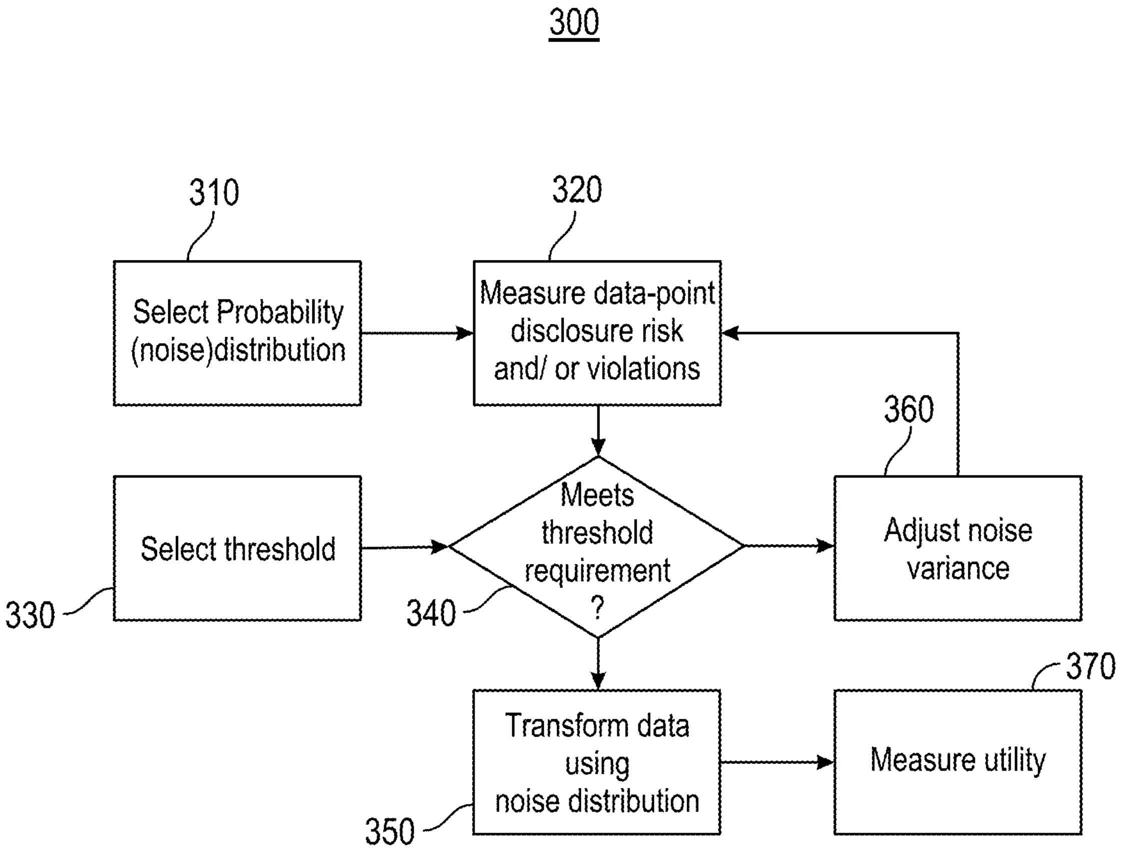
FIG. 3 illustrates flow chart that illustrates how the noise function is selected in accordance with an embodiment of the invention.

In FIG. 3, a flowchart 300 is illustrated involving the mixed noise mechanism, i.e. the application of the Gaussian/k-noise function with the Laplace noise function. At step 310, a probability noise distribution is selected. As such, the normal noise distribution or Gaussian or k-noise distribution is selected. When the blocks of data containing patient information, educational information, financial information, or other confidential or private information appear normal or consistent, the Gaussian or k-noise distribution is applied. At step 320, the data-point disclosure risk (expected cluster based on similarity) and/or violations are measured. The CPU determines if one or more violations have occurred within the blocks of data that contain the various information. A determination is made if the information with the cluster is normal and consistent, or if one or more violations have occurred relative to the privacy threshold. Moreover, the CPU determines if the sensitivity of the data is large. The CPU can also determine if other various distortions have occurred within the blocks of data.

Referring to FIG. 3, at step 330, a threshold is selected for privacy, confidentiality, and/or differential privacy. The threshold can be the threshold level in which a loss of privacy or confidentiality occurs. Further, at step 340, a determination is made whether the loss in privacy and/or confidentiality is less than a threshold and/or meets a threshold requirement. The CPU within the computing system will determine if the loss of confidentiality and/or privacy within the blocks of data have exceeded a threshold. At step 350, the data of information is transformed or modified using the Gaussian or k-noise distribution.

In FIG. 3, at step 360, the noise variance is adjusted, globally to all noise, by block, or locally by subject to achieve the desired similarity threshold k and/or utility requirements. When it is determined by the CPU that the one or more violations have occurred in the blocks of data, the CPU will apply a Laplace noise distribution to help reduce the violations, and thereby the sensitivity, within the blocks of data. The data utility will also be increased as a result. The Laplace noise distribution combined with the Gaussian or k-noise distribution will provide a mixed-noise mechanism onto the blocks of data. The mixed-noise mechanism should reduce the number of violations and the sensitivity level of the blocks of data. At step 370, the data utility of the blocks of information is measured by the CPU. Further, the mixed noise mechanism is used to preserve privacy and optimize data utility, wherein the mixed noise mechanism includes the Gaussian and/or k-noise distribution with the Laplace noise distribution that is applied onto the blocks of data. With respect to the data utility, the data utility can be a measure of how close any transformed statistic or data is to the true or ideal statistic or data. A practical means of achieving higher data utility while maintaining protection afforded by differential privacy is obtained.

Figure 4:
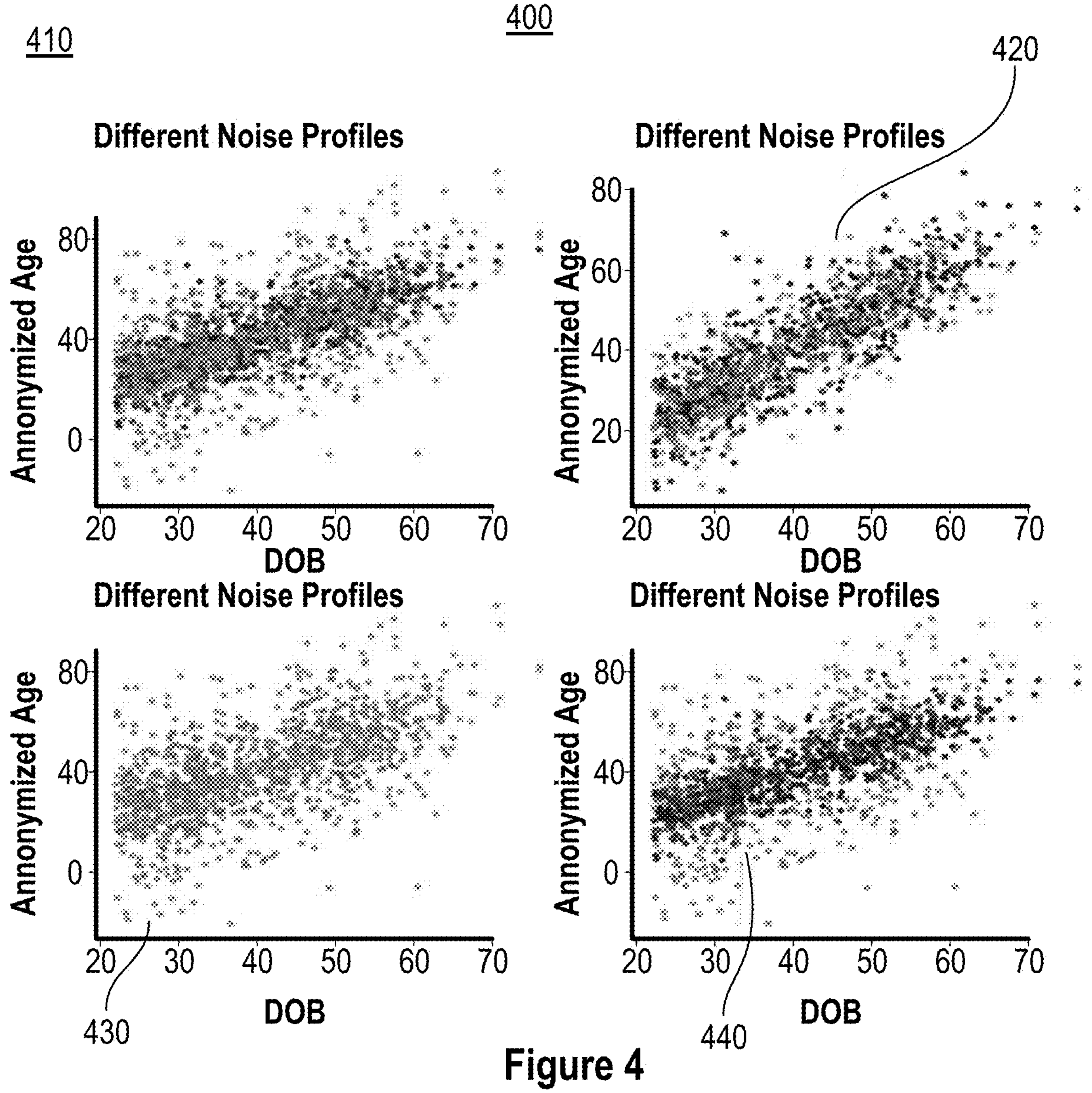
FIG. 4 depicts graphical illustrations showing improvement in data utility and different noise transformations in accordance with an embodiment of the invention.

Referring to FIG. 4, a system 400 of noise profiles are illustrated to illustrate the advantages of the mixed-noise mechanism. A combination of noise profiles 410, 420, 430, and 440 are included. Public datasets are anonymized with a classic Laplace differential privacy (DP), Classic Epsilon-Delta DP and a mixed-noise mechanism.

In FIG. 4, the noise profiles 410, 420, and 430 illustrate a Laplace DP, mixed-noise mechanism, and a Gaussian Noise distribution. The majority of plots in the middle clearly show how the mixed-noise function does not inject as much noise as the Laplace or Gaussian noise distributions. As a result, the mixed-noise function enables the blocks of data to remain normal and consistent. The sensitivity and distortion within the blocks of data can remain consistent and normal. The noise profile 440 shows mostly the Gaussian noise function. The Gaussian noise distribution injects a large amount of noise that can make the variability of data large. The mixed noise-mechanism can produce more consistent and normal values of the blocks of data. As such, the noise profiles 410, 420, 430, and 440 illustrate how the mixed-noise mechanism show in noise profiles 410, 420, and 430 produce less deviations of the data. In addition, in some embodiments, the ratios of a Laplace noise function sum and Gaussian noise function sum can be compared to a ratio of the Laplace noise function sum and mixed-noised mechanism sum. If the ratio is greater than 1, than the mixed-noise mechanism performs better in terms of adding less noise and therefore having higher data utility. The mixed-noise mechanism improves data utility significantly while keeping the same level of privacy.

Figure 5A:
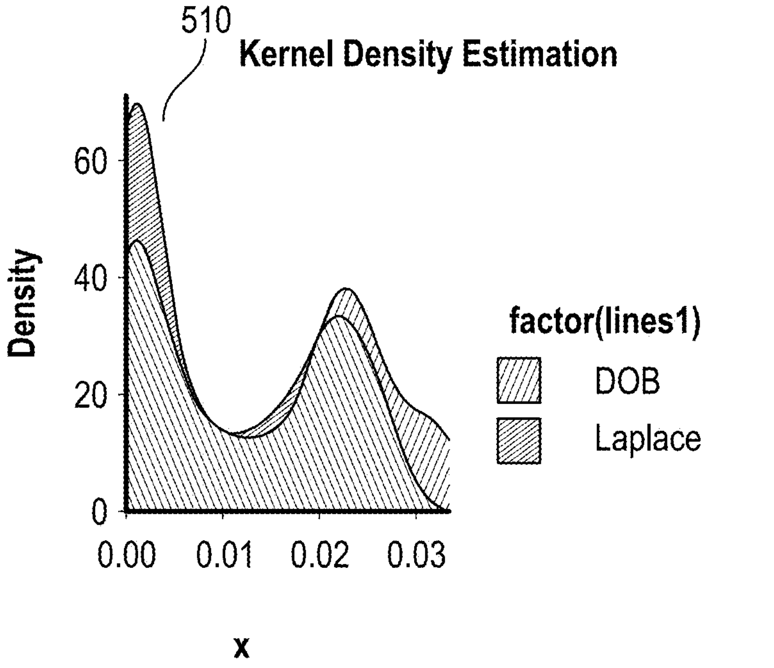
FIGS. 5(A)-5(D) illustrate graphical illustrations showing how the original attributes of the data have been preserved even after transformation has occurred, wherein a comparison is made to other methods to show improvement in accordance with an embodiment of the invention.
Figure 5B:
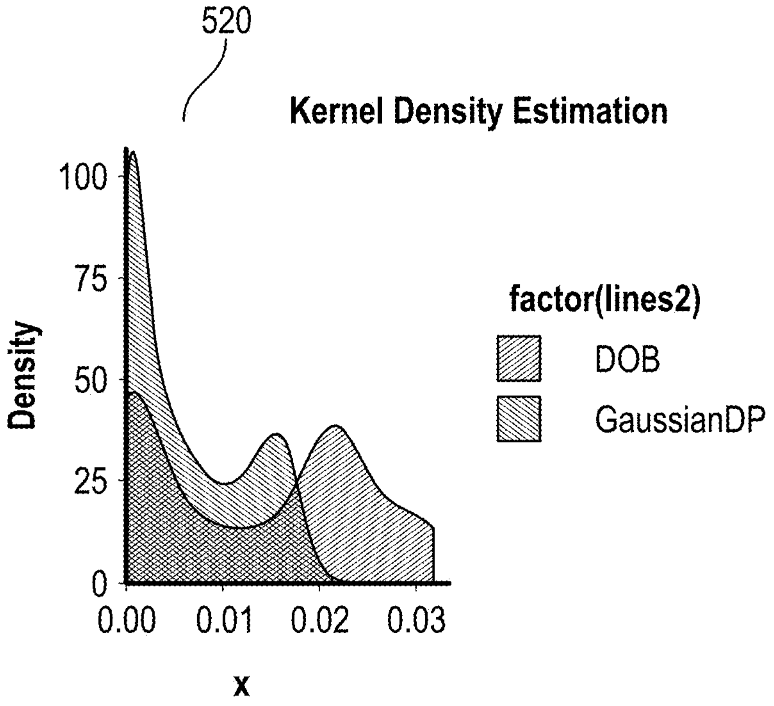
Figure 5C:
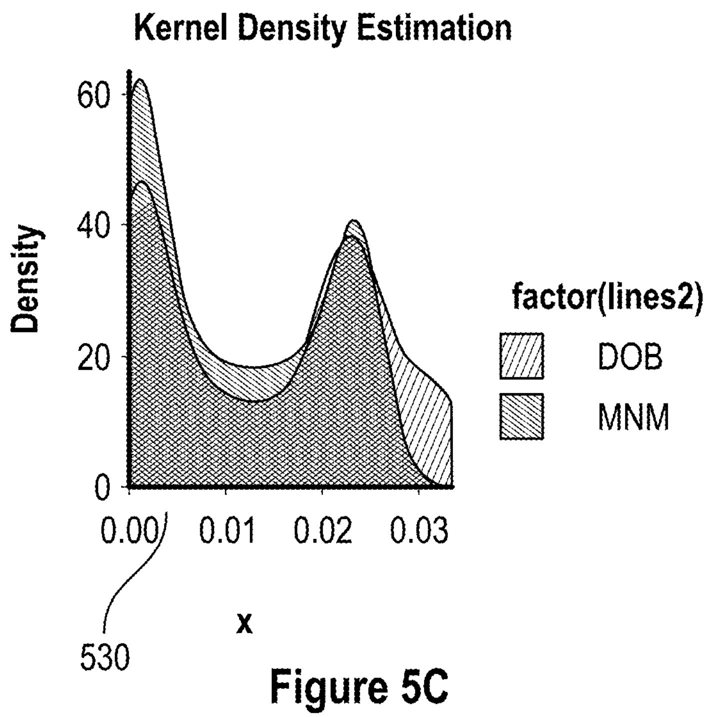
Figure 5D:
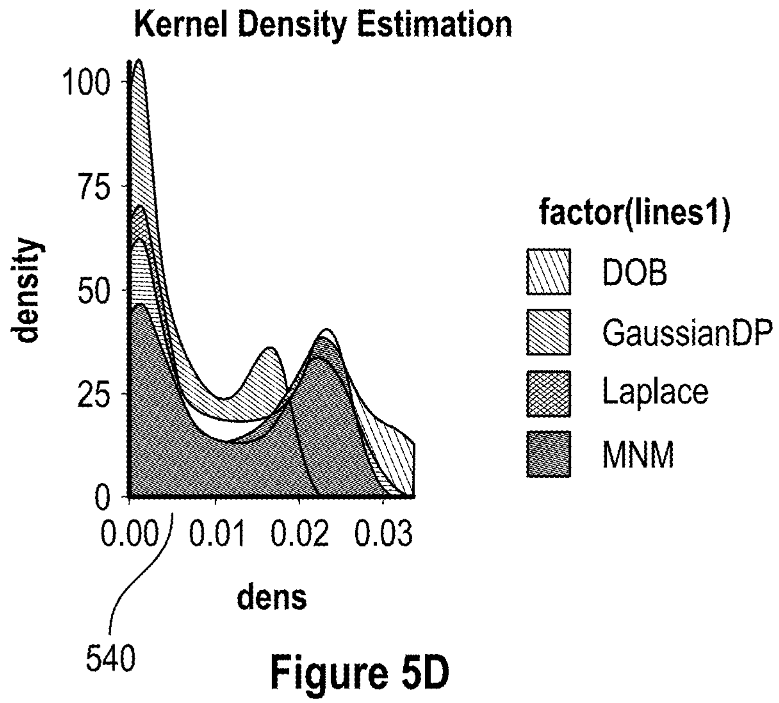

Referring to FIGS. 5(A)-5(D), the kernel density of Laplace, Gaussian, mixed noise mechanism, and all together the DOB, Gaussian, Laplace, and mixed-noise mechanism are illustrated. In FIG. 5(A), the kernel density estimation 510 of the Laplace noise distribution is compared with the DOB distribution. In FIG. 5(B), the kernel density estimation 520 of the Gaussian distribution is compared with the DOB. Further, in FIG. 5(C), the kernel density estimation 530 of the mixed-noise mechanism that includes a combination of the Gaussian or k-noise distribution with the Laplace noise distribution is shown in comparison to the DOB. In addition, in FIG. 5(D), the kernel density estimation 540 of Gaussian distribution, Laplace distribution, and mixed-noise mechanism is shown in comparison to the DOB.

In FIGS. 5(A)-5(D), to test the mixed noise-mechanism against the Laplace and Gaussian noise function, a sample mean of a dataset is calculated. The Laplace, Gaussian, and mixed-noise function are added. A ratio of Laplace/Gaussian, and Laplace/MNM (mixed-noise mechanism) are taken. If the value of the ratio is greater than one, than the Laplace noise function is the inferior noise function. When the ratio is small or less than one, than the Laplace noise function has performed better than the other noise function. Further, when the underlying distribution is exponential, the better that the mixed-noise mechanism will get in comparison to either the Laplace and Gaussian noise functions. When the variance in data increases, the mixed-noise mechanism performs better then the Laplace and Gaussian noise functions. As is shown from the kernel density estimations 510, 520, 530, and 540, the mixed-noise mechanism performs more favorably in relation to the DOB than the Laplace or Gaussian noise distributions. As mentioned above, when the ratio is greater than 1, the mixed-noise distribution performs better and therefore has higher data utility as a result.

Figure 6:
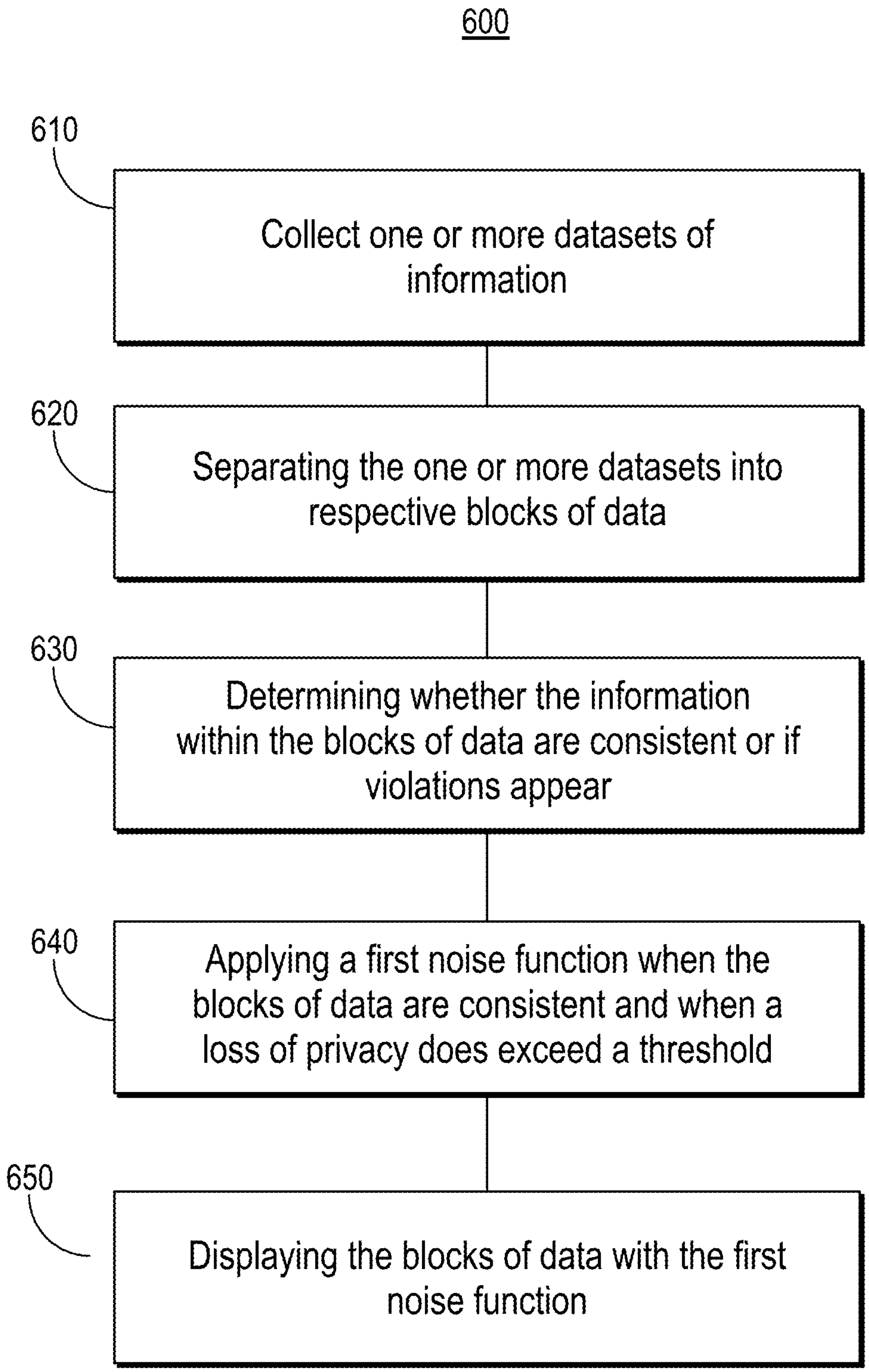
FIG. 6 illustrates a flowchart in accordance with an embodiment of the invention, which can also be reversed.

In FIG. 6, a method 600 illustrating applying a first noise function is illustrated. Moreover, a computing system that receives datasets of information that include financial information, patient information, educational information, or confidential or private information determines the appropriate noise function to apply.

Referring to FIG. 6, at step 610, the processor within the computing system collects one or more datasets of information. As mentioned above, information includes either patient information, financial information, educational information, private and/or confidential information.

In FIG. 6, at step 620, the processor separates the one or more datasets into respective blocks of data. When the datasets are separated by the processor into one or more respective blocks, the processor can then determine if the data within the blocks are normal or consistent. Further, the processor can also determine if one or more violations are present within the blocks of data.

Referring to FIG. 6, at step 630, the processor identifies if the information within the blocks of data are consistent, or if one or more violations relative to differential privacy occur within the blocks of data. The processor is determining whether to apply a Gaussian, k-noise function, or Laplace noise function. If the processor determines that the data appears normal or consistent, the processor will apply the Gaussian or k-noise function. In contrast, if the processor determines if that one or more violations are within the blocks of data, then the processor will apply the Laplace noise function to reduce the one or more violations.

In FIG. 6, at step 640, the processor applies a first noise function when the blocks of data are consistent and when a loss of privacy exceeds a threshold. Further, the first noise function is the Gaussian or k-noise function. When the processor determines that the data appears normal and consistent, the processor applies the Gaussian or k-noise function. Nevertheless, in other embodiments, when the one or more violations occur, the processor will then add the Laplace noise function in combination with the Gaussian or k-noise function. As a result, the mixed-noise mechanism will ultimately be provided to reduce or correct the one or more violations. The mixed-noise mechanism will also optimize the data utility of the blocks of data.

Referring to FIG. 6, at step 650, the display within the computing system will display the blocks of data with the first noise function. When the Laplace noise function is also applied with the Gaussian or k-noise function, the display will also show the blocks of data with the mixed-noise function/mechanism.

The application of the mixed-noise mechanism will perform better than the Laplace noise function from a data utility perspective. In addition, The Gaussian noise function and/or k-noise function will not perform as well relative to data utility. The data utility is significantly improved while maintaining the same level of privacy.

Figure 7:
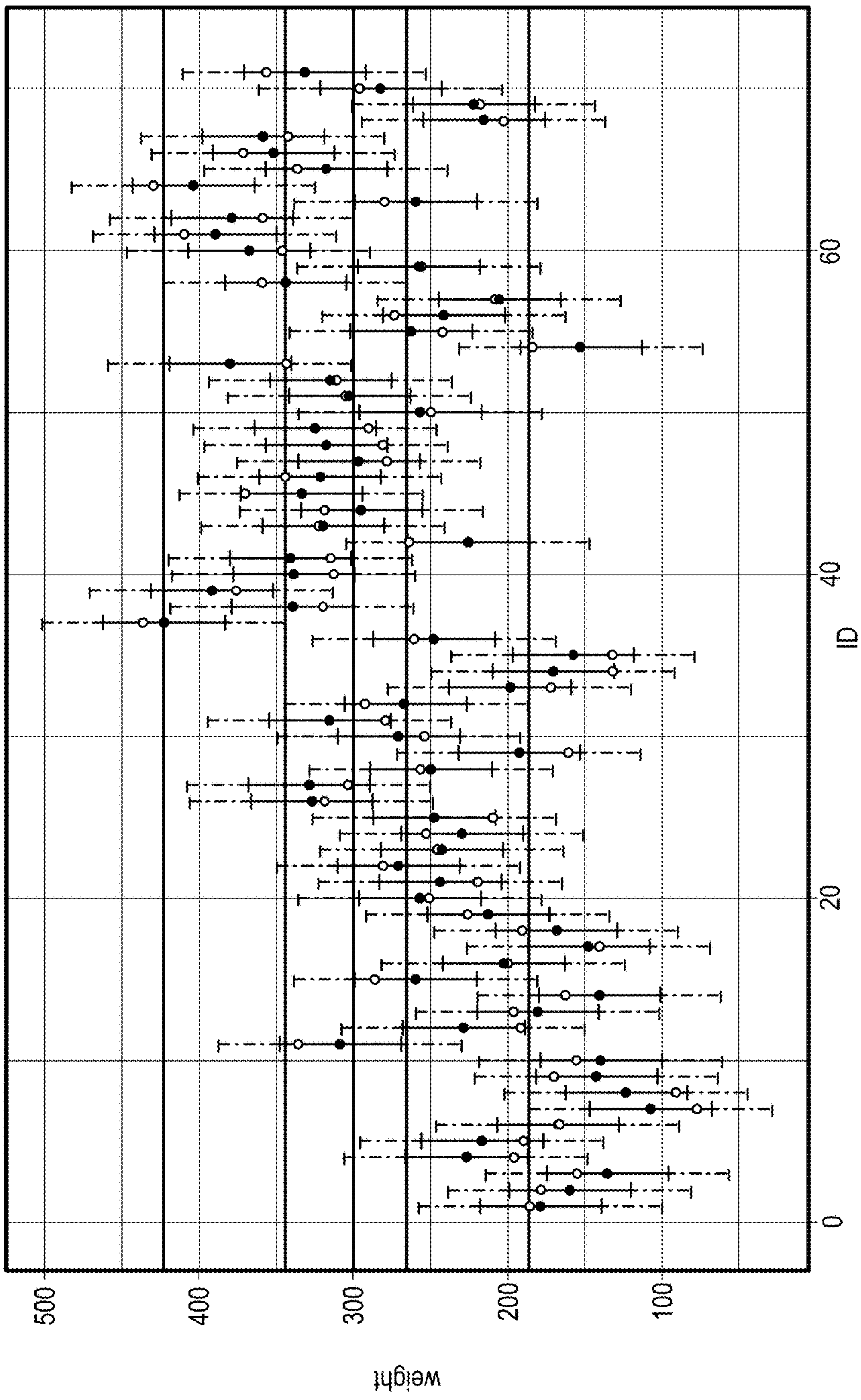
FIG. 7 illustrates a graphical application of k-noise, and how noise can be applied to the data while preserving the similarity threshold k; and Unless otherwise indicated illustrations in the figures are not necessarily drawn to scale.

In FIG. 7, an graphical illustration 700 of the k-noise function is illustrated. Moreover, FIG. 7 illustrates a graphical application of k-noise, and how noise can be applied to the data while preserving the similarity threshold k, along the y-axis in this example. In this illustration, the horizontal dotted lines are the blocks that represent the subject similarity that achieve k, based on what a user can infer from the noise injection, and the horizontal solid lines are the noise variance applied to the data. This can also be generalized to a local setting where the subjects are measured point by point based on the interval of similarity, with the noise variance adjusted to achieve the user determined similarity threshold k for each individual subject or by block.

Those skilled in the art will appreciate that the example embodiments are non-exhaustive and that embodiments other than that described here may be included without departing from the scope and spirit of the presently disclosed embodiments.

Advantages

Overall, a computing system can receive data on patients, financial information, educational information, and other confidential or private information from one or more databases. The computing system can then separate the data into blocks of data to identify if the data are normal and consistent or if one or more violations have occurred within the blocks of data.

The computing system can determine whether the blocks of data should receive a Gaussian, k-noise and/or Laplace noise function. When the computing system determines that the blocks of data are normal and/or consistent, then the computing system can apply a Gaussian or k-noise distribution as a first noise distribution. The k-noise function involves a similarity threshold noise level that that user decides. Moreover, there are established benchmarks for similarity levels using k that the user determines and can easily understand, thereby reducing the effort to train experts. K is typically an integer of 1 or more, representing the number of subjects expected in a block of data, and/or fractional when used as a risk function with 1/k. With the k-noise function, there is no need to adjust any functions, besides the desired noise function and variance which can be adjusted globally, by individual blocks, or by individual subjects in order to achieve the desired similarity threshold of k and/or utility requirements. In contrast, only the output needs to be varied or changed. However, when the one or more blocks of data include violations at one or more intervals, the computing system can also apply the Laplace noise function onto the Gaussian or k-noise function.

The combined Gaussian, k-noise and/or Laplace noise function will enable a mixed-noise function to be applied on the blocks of data. When the mixed-noise function is applied, the one or more violations within the blocks of data can be reduced or removed. Further, the information within the blocks of data will appear more consistent and normal. In addition, when mixed-noise mechanism will perform better in relation to data utility than the Laplace noise function, Gaussian noise function, and k-noise function.

The computing system can identify when there is a distortion in the information within the blocks of data. Moreover, when the financial information, educational information, patient information, or other private or confidential information appears distorted or compromised, the computing system can apply the mixed-nose mechanism. Moreover, the deviations in the information are less with the mixed-noise mechanism than with only the use of the Gaussian or k-noise function. As such, the computing system is able to identify when to use the Laplace noise function with the Gaussian or k-noise function to reduce the deviations within the blocks of data. In addition, the mixed-noise function will optimize the data utility of the information within the blocks of data.

The computing system can create a bridge between data and artificial intelligence (AI) methods. The safe AI bridge calls the data, but it injects a suitable degree of noise to the data before passing on to the AI method, including federated models. The noise can be continuous or categorical and based on a threshold to ensure disclosure risks are minimized. Perturbation can occur to the data itself before any analytical or AI method is applied, reducing the training of experts since they can use AI methods and tools they are familiar with, and allowing for the most current AI algorithms and methods to be used without additional overhead. Furthermore, implementation efforts and diskspace are reduced since the noise injection is separated from the AI methods. Additional efficiencies can be introduced by the computing system based on the type of AI method, mostly to improve the utility of the resulting data, and in how overlapping data are aggregated in the final output.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A computer-implemented method comprising:

collecting one or more datasets of information;

first determining whether information within blocks of data are consistent or if one or more violations occur within the blocks of data;

applying a first noise function to the blocks of data when the first determining comprises determining that the information within the blocks of data are consistent, the first noise function comprising a first type of noise distribution function;

applying a second noise function to the blocks of data when the first determining comprises determining that the one or more violations occur within the blocks of data, the second noise function comprising a second type of noise distribution function in combination with the first type of noise distribution function; and displaying the blocks of data with at least one of the first noise function or the second noise function.

2. The computer-implemented method of claim 1, wherein the first type of noise distribution function comprises a k-noise function.

3. The computer-implemented method of claim 1, wherein the first type of noise distribution function comprises a Gaussian function.

4. The computer-implemented method of claim 1, wherein the second type of noise distribution function comprises a Laplace noise function.

5. The computer-implemented method of claim 1, wherein the information includes educational information on one or more users.

6. The computer-implemented method of claim 1, further comprising averaging a loss of privacy for each of the blocks of data before applying the first noise function or the second noise function.

7. The computer-implemented method of claim 1, further comprising averaging a loss of confidentiality for each of the blocks of data before applying the first noise function or the second noise function.

8. The computer-implemented method of claim 1, further comprising combining information and analytical results relative to protocol deviations within the blocks of data before the first noise function or the second noise function are applied.

9. The computer-implemented method of claim 1, further comprising:

determining that the first noise function has caused distortion in the blocks of data after the first noise function has been applied; and applying, based on the determining that the noise function has caused the distortion, the second noise function to the blocks of data.

10. A computer program product comprising a non-transitory storage medium encoded with processor-readable instructions that, when executed by one or more processors, enable the computer program product to:

collecting one or more datasets of information;

first determining whether information within blocks of data are consistent or if one or more violations occur within the blocks of data;

applying a first noise function to the blocks of data when the first determining comprises determining that the information within the blocks of data are consistent, the first noise function comprising a first type of noise distribution function;

applying a second noise function to the blocks of data when the first determining comprises determining that the one or more violations occur within the blocks of data, the second noise function comprising a second type of noise distribution function in combination with the first type of noise distribution function; and displaying the blocks of data with at least one of the first noise function or the second noise function.

11. The computer program product of claim 10, wherein the first type of noise distribution function comprises a k-noise function.

12. The computer program product of claim 10, wherein the first type of noise distribution function comprises a Gaussian function.

13. The computer program product of claim 10, wherein the second type of noise distribution function comprises a Laplace noise function.

14. The computer program product of claim 10, wherein the information includes educational information on one or more users.

15. The computer program product of claim 10, wherein the process further comprises averaging a loss of privacy for each of the blocks of data before applying the first noise function or the second noise function.

16. The computer program product of claim 10, wherein the process further comprises averaging a loss of confidentiality for each of the blocks of data before applying the first noise function or the second noise function.

17. The computer program product of claim 10, wherein the process further comprises combining information and analytical results relative to protocol deviations within the blocks of data before the first noise function or the second noise function are applied.

18. The computer program product of claim 10, wherein the process further comprises:

determining that the first noise function has caused distortion in the blocks of data after the first noise function has been applied; and applying, based on the determining that the noise function has caused the distortion, the second noise function to the blocks of data.

19. A system comprising:

one or more memories;

one or more processors communicatively coupled to the one or more memories, the one or more processors configured to perform a process comprising:

collecting one or more datasets of information;

first determining whether information within blocks of data are consistent or if one or more violations occur within the blocks of data;

applying a first noise function to the blocks of data when the first determining comprises determining that the information within the blocks of data are consistent, the first noise function comprising a first type of noise distribution function;

applying a second noise function to the blocks of data when the first determining comprises determining that the one or more violations occur within the blocks of data, the second noise function comprising a second type of noise distribution function in combination with the first type of noise distribution function; and displaying the blocks of data with at least one of the first noise function or the second noise function.

20. The system of claim 19, wherein the first type of noise distribution function comprises a k-noise function.

* * * * *